United States Patent [19]
Valyi

[11] 3,902,617
[45] Sept. 2, 1975

[54] HOLLOW PLASTIC CONTAINER

[76] Inventor: Emery I. Valyi, 5200 Sycamore Ave., Riverdale, N.Y. 10471

[22] Filed: Jan. 21, 1974

[21] Appl. No.: 434,917

[52] U.S. Cl. ................................ 215/2; 215/1 C
[51] Int. Cl.² ........................................ B65D 1/02
[58] Field of Search .................. 215/1 C, 2, 12 R; 220/63 R; 229/14 B, 5.5, 48 T

[56] References Cited
UNITED STATES PATENTS

| | | | |
|---|---|---|---|
| 483,258 | 9/1892 | Meyer | 215/2 UX |
| 2,207,003 | 7/1940 | Dunlap | 229/5.5 X |
| 2,781,551 | 2/1957 | Richerod | 215/1 C X |
| 2,982,450 | 5/1961 | Whitton | 215/1 C UX |
| 3,272,366 | 9/1966 | Ikeda | 215/2 |
| 3,409,710 | 11/1968 | Klygis | 215/1 C X |
| 3,717,544 | 2/1973 | Valyi | 220/63 R X |
| 3,719,735 | 3/1973 | Valyi | 264/89 |

Primary Examiner—Donald F. Norton
Attorney, Agent, or Firm—Robert H. Bachman

[57] ABSTRACT

A multilayered, hollow plastic container having an inner and outer molded portion of thermoplastic material. The container has a bottom wall, a peripheral side wall extending vertically upward from the bottom wall and terminating at its upper end in a mouth, with the bottom wall being originally separate from the side wall.

13 Claims, 5 Drawing Figures

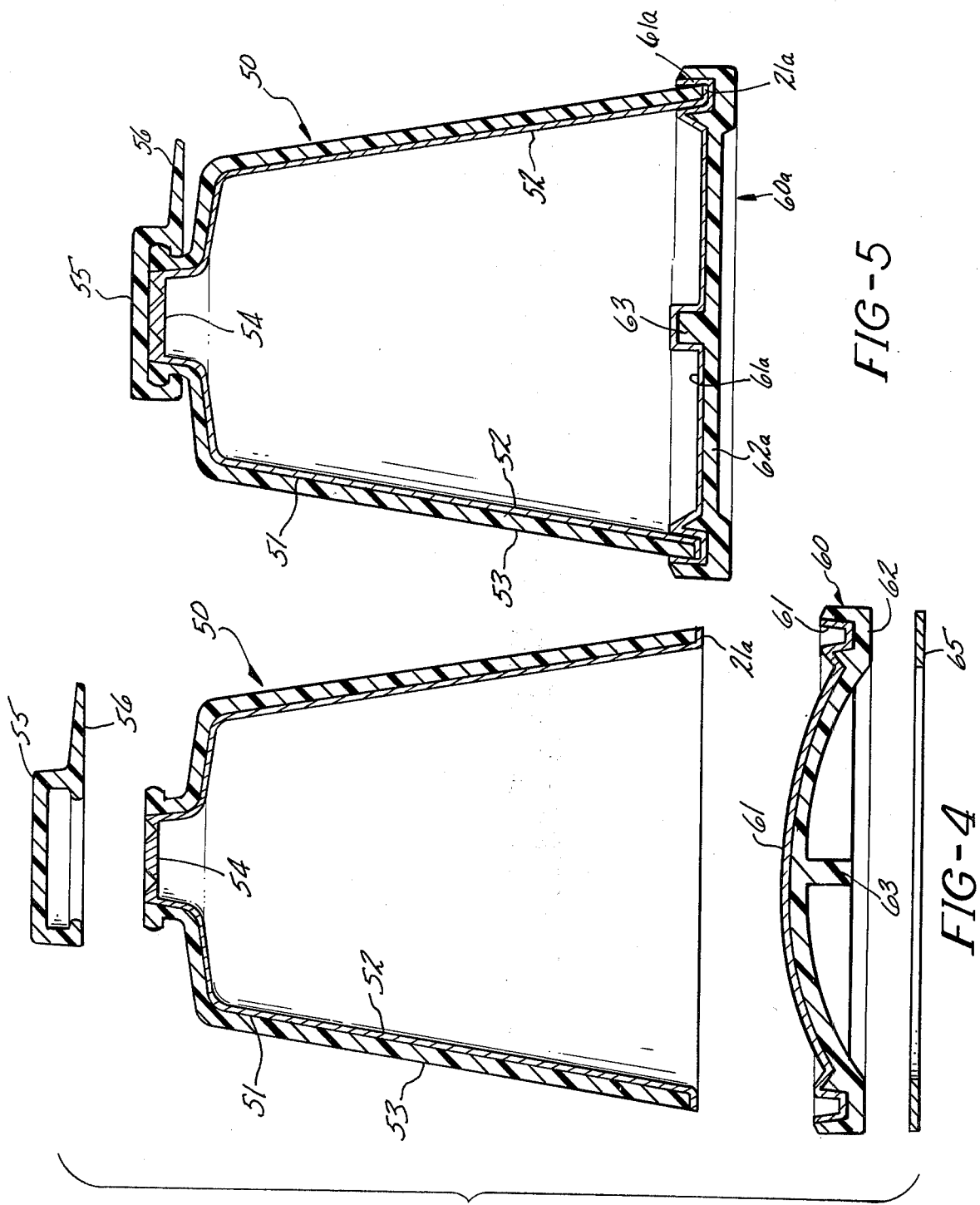

HOLLOW PLASTIC CONTAINER

BACKGROUND OF THE INVENTION

This invention relates to multilayered plastic containers that are provided with a liner or inner layer having different properties than the remainder of the container. Such lined containers are desirable whenever it is difficult to satisfy all of the requirements and specifications by using a single plastic. For example, my previous U.S. Pat. Nos. 3,717,544 and 3,719,735 disclose multilayered plastic containers and the preparation of same characterized by placing a relatively thin sleeve of plastic over a blow core corresponding to the shape of the blow core, molding organic plastic material thereover in a parison mold to form a composite parison and expanding the composite parison in a blow hold to form a multilayered, hollow plastic material.

It is particularly desirable to develop a multi-layered plastic container which is suitable for use with beverages, such as carbonated beverages, where different properties are desired in the liner and the remainder of the container.

One may desire a linear which is suitable for preventing loss of carbonation in a carbonated beverage, while desiring the remainder of the container to have high strength in order to prevent physical damage. Naturally, a container of this type should have certain characteristics. For example, it should be inexpensive and convenient to produce and to transport, it should be convenient to fill in a commercial operation, and, while preferably a container of the easy open variety, it should be pilferproof.

Accordingly, it is a principal object of the present invention to provide a multilayered, plastic container which is suitable for a wide variety of uses, especially for use with beverages, such as carbonated beverages.

It is an additional object of the present invention to provide a container as aforesaid which is inexpensive and convenient to produce, which is capable of being transported in the nested condition and which is convenient to fill in a commercial operation by using high speed filling devices.

An additional object of the present invention is to provide a container as aforesaid which may be made in the easy open variety while still having the required properties for use with carbonated beverages.

Additional objects and advantages of the present invention will appear hereinafter.

SUMMARY OF THE INVENTION

In accordance with the present invention, it has now been found that the foregoing objects and advantages may be readily obtained. The container of the present invention is a multilayered, hollow plastic container having a bottom wall, a perpherally extending side wall extending vertically upward from the bottom wall and terminating at its upper end in a mouth, said bottom wall being separately attachable to the side wall. The container has an inner, first layer of a thermoplastic material which is preferably thermoformed, but may be made by other known procedures as well, said layer defining the side wall and mouth, usually scored at the mouth, and an outer second layer of a pressure molded, thermoplastic material adhered to the inner layer substantially throughout the extent of the side wall. A disc like bottom closure is provided, connected to the side wall at the periphery of the closure. The closure is separate from the side wall and attachable thereto to enable filling of the container at the wide, bottom opening using high speed filling equipment. Preferably, but not necessarily, the bottom closure is a composite material having an inside layer and an outside layer, with the inside layer corresponding in composition to the inner layer of the container and the outside layer corresponding in composition to the outer layer of the container. After the container is filled. the bottom closure is sealingly connected to the side walls of the container, preferably by sealing together the inner first layer of the peripherally extending side wall and the inside layer of the closure to form a substantially impervious layer.

BRIEF DESCRIPTION OF THE DRAWINGS

The present invention will be more readily understood from a consideration of the accompanying drawings in which:

FIG. 4 is a sectional view of the component units of the container of the present invention; and FIG. 5 is a sectional view of a modified container of the present invention in the assembled condition.

DETAILED DESCRIPTION

Figure 1:
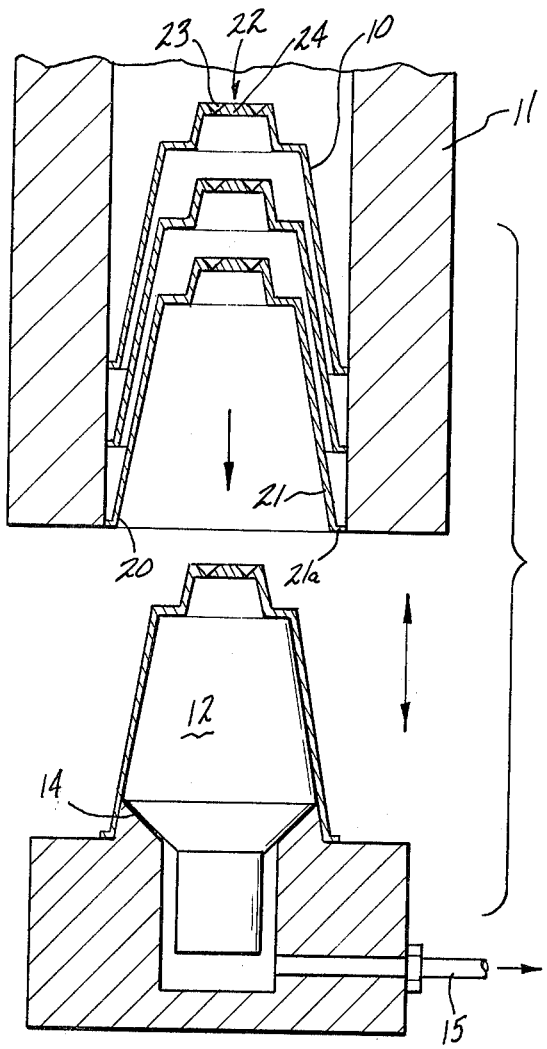
FIG. 1 is a diagrammatic view of a holder for the stacked liners in relation to a core.

FIG. 1 shows a plurality of liners 10 stacked and placed into a holding fixture 11 which may be brought into alignment with a core, such as blow core 12. The liner has an inner surface closely approximating the outer surface of the core so that the liner fits snugly thereover. The liners 10 are fed onto the core 12 by any desired means, such as moving the core 12 into the holding fixture 11 and applying a vacuum to slots 14 via line 15, which may be connected to a source of vacuum (not shown). The core is then withdrawn from the fixture with the liner thereon. Naturally, it should be understood that any suitable means may be employed for placing the liner on the core, or for holding a plurality of liners.

It can be seen from FIG. 1 that the liner 10 has an open bottom 20, peripherally extending side wall 21 with an outwardly flaring rim 21a at the base thereof, said side wall extending vertically upward from the open bottom and terminating at its upper end in a mouth 22. Side wall 21 is flared to enable nesting of the liners. Mouth 22 may be scored, as at 23, and may have a thickened portion 24 adjacent the scoring. It can be seen that the liner 10 will provide the inner layer of the side wall of the composite container of the present invention and the mouth portion thereof.

The liner may be prepared by such known methods as vacuum forming or thermoforming from plastic sheet to provide a drawn, thermoplastic material of the desired configuration. For example, a sheet of thermoplastic material from which the liner is to be made may be heated to a temperature at which it becomes deformable. The heated sheets may be placed into juxtaposition with a mold and a forming plug having the desired configuration and the sheet converted into the desired shape by drawing the sheet into the mold which intrinsically produces attenuation of the sheet at the side walls. Scored portions 23 may be simultaneously produced by providing a corresponding ridge on the plug. The thickened portion 24 is obtained due to the fact that the sheet is less attenuated in drawing at the center than it is at the side walls, as is known in the art.

The core 12 with the liner 10 thereon is then transferred to a mold 30 which may be a parison mold (FIG. 2) by suitable actuating means (not shown). An injection nozzle 31 is connected to a source of hot, moldable plastic from which the plastic may be injected into the mold 30. The mold 30 coacts with core 12 to provide mold cavity 32 which may be filled with plastic from nozzle 31 under pressure, as is customary in injection molding. The molten plastic is then injected over the liner to fill the cavity 32. As can be seen from FIG. 2, the liner 10 contacts the upper portion 30a of mold 30 so that the molten plastic is injected around liner side wall 21 only and no plastic is injected against liner mouth 22. In other words, the core 12 forces liner mouth 22 into contact with the upper portion 30a of mold 30 and thereby provides a mold cavity 32 which surrounds the liner side wall 21. Note that outwardly flaring rim 21a forms the base of the side wall and that the molten plastic is injected against said rim.

As is known in the art, the core 12 may be kept at an elevated temperature, as by means of internal circulation of a heated fluid. Accordingly, the liner 10 will be heated by the core once they are brought into contact with each other. After injection of molten plastic the liner 10 will be further heated to a temperature approaching that of the incoming plastic. When so heated, the liner is rendered readily deformable in case expansion of the side walls by blow molding techniques is desire as will be shown hereinbelow, and also the liner will be adhered to the freshly injected plastic substantially throughout their contacting surfaces.

Thus, a lined parison 40 is prepared having a composite side wall with an inner first layer of a drawn, thermoplastic material and an outer second layer of a pressure molded, thermoplastic material with the inner first layer having an outwardly flaring rim 21a at the base thereof so that the liner overlaps the outer layer at the base thereof. The mouth of the parison is a single layer of the drawn thermoplastic material which may have a scored portion 23 and a thickened portion 24 adjacent thereto. The side walls of the parison are flared so that each parison is nestable with other like parisons.

In the process of pressure molding in accurate molds, close dimensional tolerances are maintained. Whether the container body of this invention is simply pressure molded, or subsequently also blown, the bottom rim 21a will be accurate within a few thousands of an inch, for typical dimensions of small to medium containers, within about 0.002 inches. If the pressure molded article is blown, the bottom rim remains unaffected, as clearly shown in FIG. 3. Hence, the accuracy of the bottom rim can be relied upon in eithr case.

Very close dimensional control of the bottom rim dimensions is unavoidably called for if any closure is to be applied so as to seal the container hermetically, even against pressure such as in a carbonated beverage bottle. The bottom closure must of course exhibit corresponding close tolerances and the tolerances of the two elements, the body and the bottom closure, must be so taken as to be compatible. Both components being pressure molded in accurate molds, this is feasible for the present invention. This applies regardless of whether the bottom closure is ultimately screwed on, held by a cam-lock, or slipped on for subsequent heat sealing, or other types of sealing.

Figure 3:
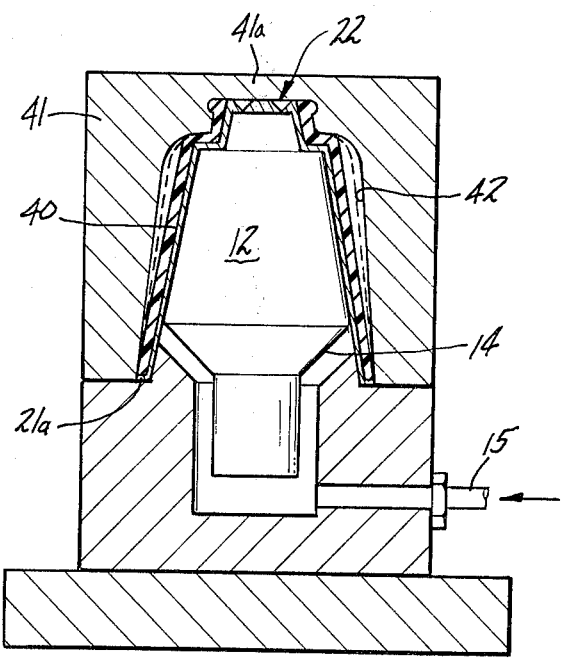
FIG. 3 is a section of a blow mold for use in the present invention.

It can be readily seen that the lined parison 40 may be conveniently employed in its present state to serve as the container of the present invention. If it is to be so used, the lined parison 40 is allowed to cool in the mold cavity 32, removed therefrom after cooling and transferred to be filled. Alternatively, if desired, the side wall of the composite parison 40 may be expanded by blow molding techniques, as shown in FIG. 3, in order to enlarge the container or achieve a particularly desired configuration. An additional advantage offered by blow molding is that the plastic is oriented thereby, thus increasing the strength properties. Thus, the core 12 may be a blow core, with slots 14 being blow slots which may be opened and closed by conventional means (not shown) and which communicates with a source of fluid pressure by means of line 15. The blow core 12 with the composite parison thereon is inserted into blow mold 41. The liner mouth 22 is pressed against the bottom 41a of the blow mold both to insure accurate alignment between the blow core and blow mold, and also to insure that there is no distension of the mouth 22 of the liner. As the next step, pressure fluid, usually compressed air, is admitted into the parison through slots 14 and the parison is expanded into the blow mold 41 to assume the shape of the blow mold cavity 42 as indicated by dotted lines in FIG. 3. Fluid pressure is maintained until the blown articles cools sufficiently in contact with the walls of the blow mold 41 to be removed therefrom.

Figure 2:
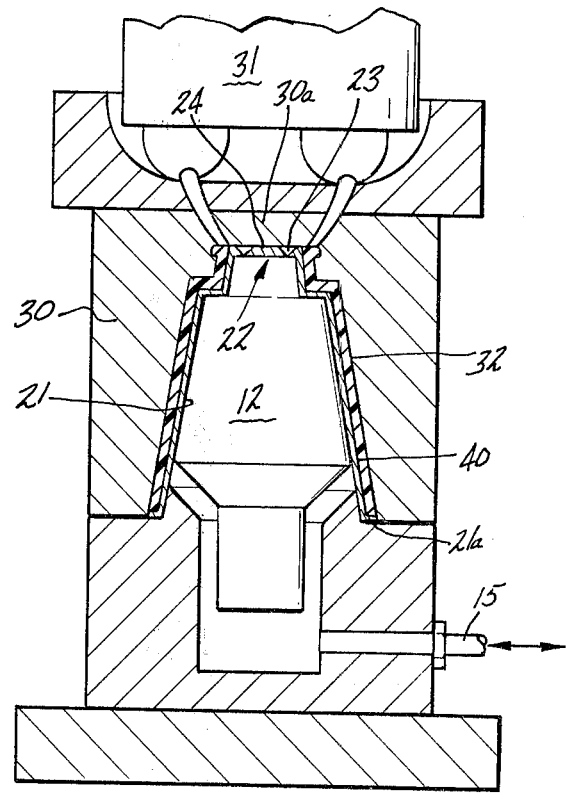
FIG. 2 is a section of a parison mold for use in the present invention.

Hence, the body of the container of the present invention is provided which may assume the configuration of the injection molded material of FIG. 2 or preferably the blow molded material of FIG. 3. In either case an open bottom container 50 is provided with a composite side wall 51 consisting of an inner first layer 52 and an outer second layer 53, a single layer mouth 54 of said liner, which may be scored as previously described, and an open mouth body is provided having sufficient taper to make it nestable. At the narrow end, which will become the pouring spout of the finished container, the liner is exposed. As shown in FIG. 4, an inexpensive overcap 55 may be provided, preferably made of plastic, which can be applied to the narrow end of the container. If the liner is scored at the narrow end, overcap 55 may be sealed to the scored portion of the liner so that the scored part is torn and opened when the cap is removed. The cap 55 may be attached to the container side wall 51 on the outside, as by heat sealing, and a tab 56 or other suitable means provided for easy removal thereof. Hence, a tamper-proof and easily openable closure system is provided by using no more than an inexpensive, flexible overcap which provides no sealing function. The overcap need not hold pressure since the liner can be made substantial enough at the opening to withstand pressure. In fact, the thermoforming process which may be used to prepare the liner favors increased thickness at that location. Naturally, if desired, one may provide a cap which provides an additional sealing function, or omit the overcap entirely and use a tear tab on the mouth 54.

To complete the container, a bottom assembly 60 is provided comprising a disclike closure which may be connected to side wall 51 around the periphery of the closure. The closure is preferably a composite having an inside layer 61 usually of a drawn or otherwise pressure molded thermoplastic material and an outside layer 62 of a pressure molded thermoplastic material adhered to the inside portion. Desirably, the inside layer 61 corresponds in composition to the side wall inner layer 52 and the outside layer 62 corresponds to the side wall outer layer 53. It is possible to construct the bottom assembly of a dissimilar material other than plastic, such as an aluminum disc. For example, a metal bottom closure may be attached to the container by double seaming or crimping.

As shown in FIG. 4, the bottom assembly 60 may be domed or curved inwardly and may include supporting members or gussets 63 for reinforcement. Such reinforcment is particularly desirable whenever the contents of the container are to be kept under pressure, such as in the case of carbonated beverages and of aerosols. Alternatively, a bottom assembly 60a, such as shown in FIG. 5, may be employed using a closure having a substantially flat configuration with 61a representing the inside layer and 62a representing the outside layer. In such a construction, gussets 63 are inside the assembled container, rather than outside as in FIG. 4. In either the embodiments of FIG. 4 or FIG. 5 it can be seen that the inwardly protruding closure or supporting member can be designed to control the filling level of a liquid filled into the container, since the liquid will be displaced upon immersion of said inward protrusion. As a result, it is possible to fill the container first only to a level that will preclude spillage and then to eliminate such air space as would otherwise remain if a closure without immersed protrusions were to be used. Naturally, other desired shapes may be chosen for the bottom assembly depending upon desired container use. The thickness distribution both of the container and the closure can be closely controlled. The outside portion of the bottom assembly can be readily injection molded and made of the same material as the container body and lined the same as the body by first placing a preformed liner into the injection mold and injecting said material against it.

Note, as clearly shown in FIG. 4 and FIG. 5, outwardly flaring rim 21a is sealed to the inside closure layer 61 or 61a.

If desired, the bottom closure can be removable. For example, a screwed on base can be employed using a sealant of a thermoplastic substance which may be softened by heating at a temperature lower than the temperature that would damage the container body or the base itself, thereby rendering the bottom closure readily removable.

Desirably, the entire operation readily lends itself to high speed production on an automated assembly line. For example, the bottom liner may be thermoformed and inserted automatically into the injection mold.

The container body and the bottom closure may be conveniently packaged and transported to the location at which the finished container is to be filled. It is to be noted particularly that the container body may be transported while nested with other like container bodies, thus providing a very advantageous shipping density.

Upon arrival at the filling location, the container bodies may be mechanically unstacked and filled by high speed filling equipment, which operates at substantially higher rates than the equipment normally employed for the filling of bottles, because the filling operation occurs through the wide opening which compares to the opening of a can. Thus the container according to this invention combines the advantages of a bottle, namely the narrow opening used for dispensing its contents, with those of a can, namely the rate of filling made possible by a large filling opening, that rate being as much as five to six times that of a bottle.

The attachment of the bottom to the container body is performed at the filling line automatically, immediately following the filling operation. It is noted that upon assembly, the inner layers or liners of the body and of the bottom are in contact over a sufficient area to provide continuity of the inner layers, thereby leaving their effectiveness uninterrupted and together forming a layer that is substantially impervious.

Many alternatives may be employed for affixing the bottom assembly to the container body. Thus a simple cam-lock or thread-lock between the body rim and the bottom may be used, if necessary, in combination with an effective sealant. Alternatively, one may heat seal the components, or one may utilize ultrasonic sealing. One may also embed a thin layer of metal in the region to be sealed and heat it by means of an induction heating coil. Alternatively, of course, a simple mechanical lock may be used in combination with a sealing compound. All of these methods of assembly and sealing are well known in the art.

Containers of the type here described are frequently exposed to the hazard of breaking due to being dropped from an excessive height. The point of impact on such occasions is usually the bottom rim of the container. In order to prevent such breakage, it is customary to provide the corner regions at the bottom with increased thickness which necessitates using excessive amounts of plastic. Instead, one may employ a shock absorbing cushion 65 in conjunction with the container according to the present invention, because it is very conveniently attachable to the outside portion 62 of the separately made bottom closure member. Such cushion 65 may be made of a foam material and pre-assembled to the closure member automatically immediately following the molding of the latter.

The container of the present invention offers considerable versatility. Thus one may select the material of the liner so as to have one of the properties that the finished article is to have and the material of the injected plastic so as to have another of the desired properties. The liner may contain several layers of laminations to provide a liner having the combined properties of several plastics. Typical materials which may be used for the outer portion include polyolefins, polystyrene, polycarbonate, polyvinyl chloride, etc. Typical liner materials include the acetal polymers, polyolefins, ionomer resins, polyallomer copolymers, polystyrene, polyvinylidene chloride, polyvinyl chloride, polycarbonates, acrylonitrile, methacrylonitrile, etc. It is also possible to produce finished articles having desirable appearance by providing different colors and degrees of transparency in the liner and the material that is injected therearound.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and

What is claimed is:

1. A multilayered, hollow plastic container having a bottom wall, a peripherally extending side wall extending upward from the bottom wall and terminating at its upper end in a mouth, said bottom wall being separately attached to said side wall, comprising: an inner first layer of thermoplastic material defining said side wall and mouth and having a portion at the mouth to provide a locus for access to the interior of the container; an outer second layer of a pressure molded, thermoplastic material covering said inner layer and adhered thereto substantially throughout the extent of said side wall; and a bottom assembly comprising a disclike closure connected to the side wall at the periphery of said closure, wherein said closure is attachable to said side wall after filling of the container from the bottom thereof, and wherein said closure is a composite, said composite having an inside layer of a thermoplastic material and an outside layer of a pressure molded, thermoplastic material, with the outside layer being adhered to the inside layer.

2. A container according to claim 1 wherein said mouth is scored.

3. A container according to claim 2 including a cap member covering said inner layer at the mouth of said container.

4. A container according to claim 3 wherein said cap member is adhered to said inner layer at the scored part thereof so that the scored part is opened when the cap is removed.

5. A container according to claim 4 including a tab on said cap for easy removal thereof.

6. A container according to claim 2 wherein the inner portion of thermoplastic material is thickened adjacent the scored part.

7. A container according to claim 1 wherein said inner first layer has an outwardly flaring rim at the base thereof.

8. A container according to claim 7 wherein said outwardly flaring rim is secured to the inside closure layer.

9. A container according to claim 1 wherein said side wall is flared so that the container is nestable with other like containers when said closure is separated therefrom.

10. A container according to claim 1 including a shock absorbing cushion connected to the periphery of said closure outside portion.

11. A container according to claim 1 wherein said closure is curved inwardly and includes a supporting member connected to the outside portion thereof.

12. A container according to claim 1 wherein said closure is flat and includes an inward supporting member connected to said closure.

13. A container according to claim 1 wherein said inner first layer of the pheripherally extending side wall and said inside layer of the closure are secured together to form a substantially impervious layer.

* * * * *